Feb. 20, 1951     D. A. ENSIGN     2,542,404
POWER DISTRIBUTION SYSTEM
Filed Dec. 16, 1948     5 Sheets-Sheet 1
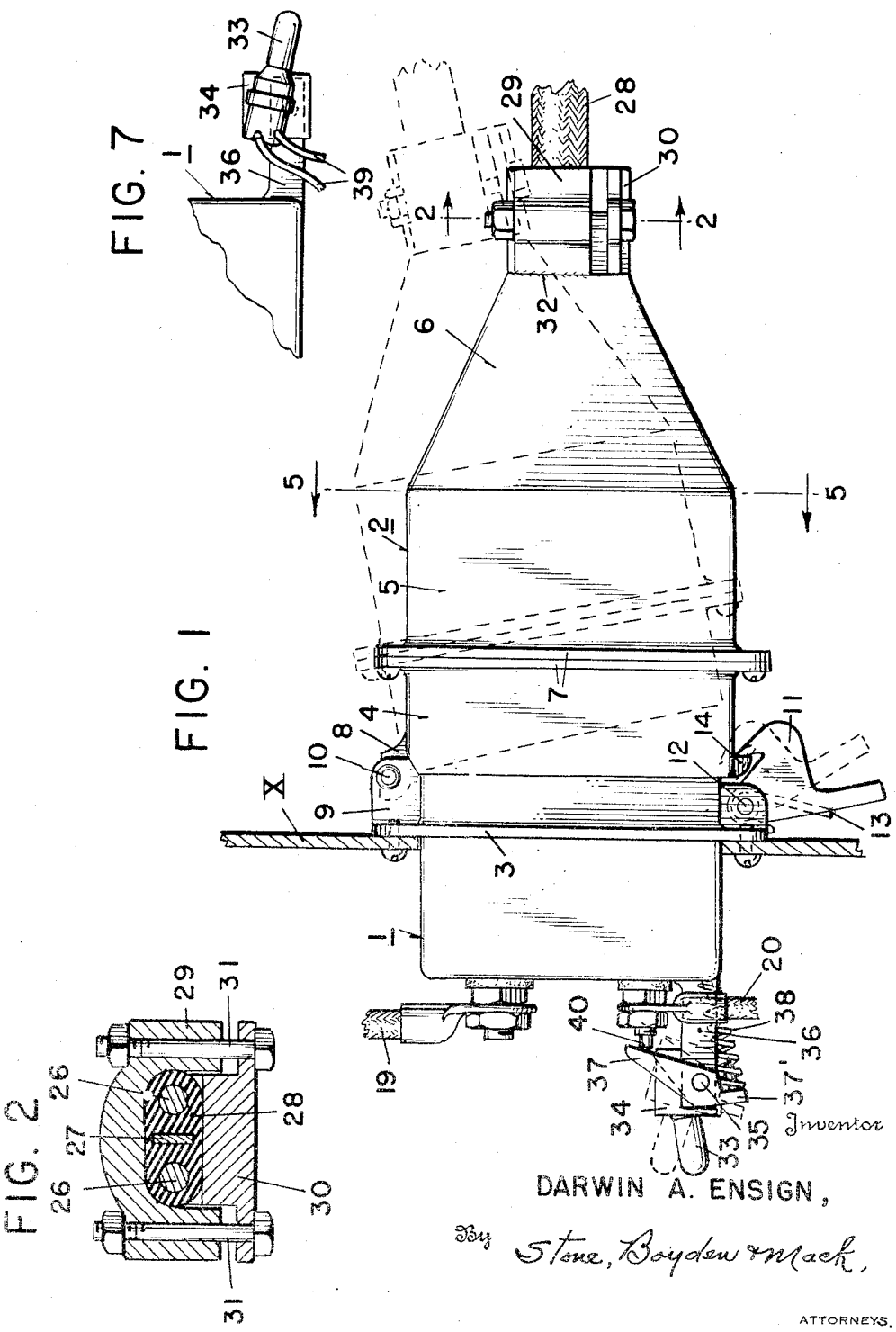
Inventor
DARWIN A. ENSIGN,
By Stone, Boyden & Mack,
ATTORNEYS.

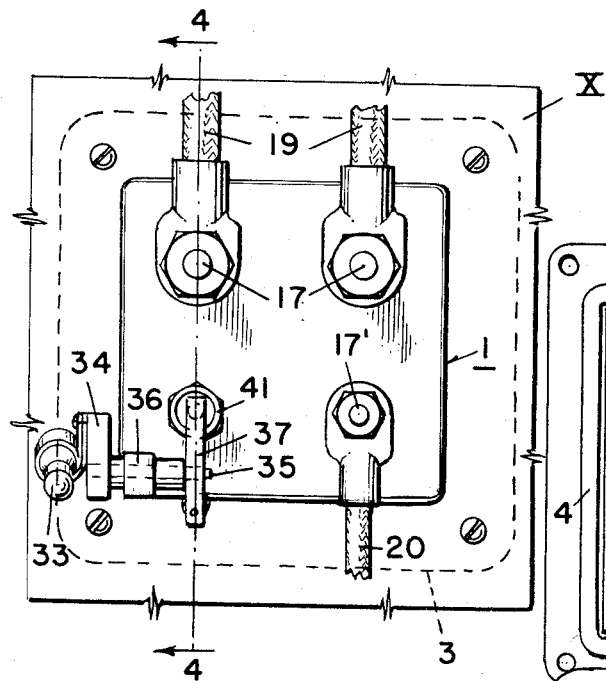
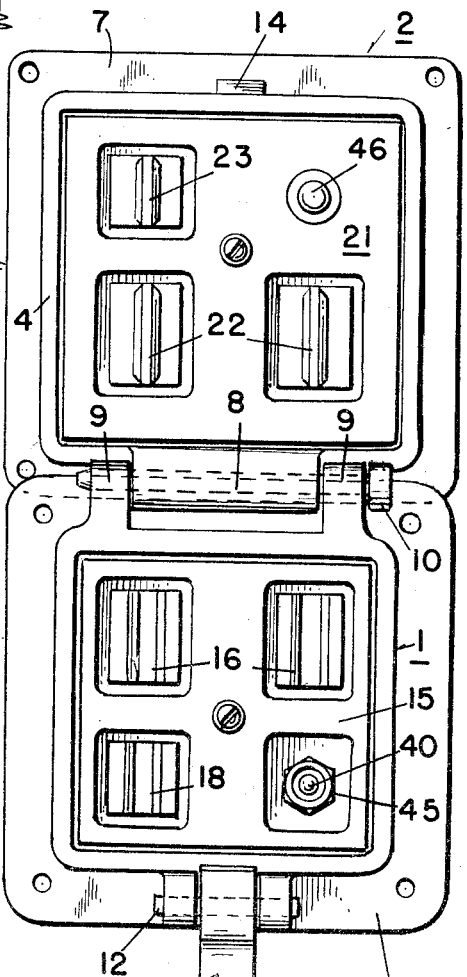
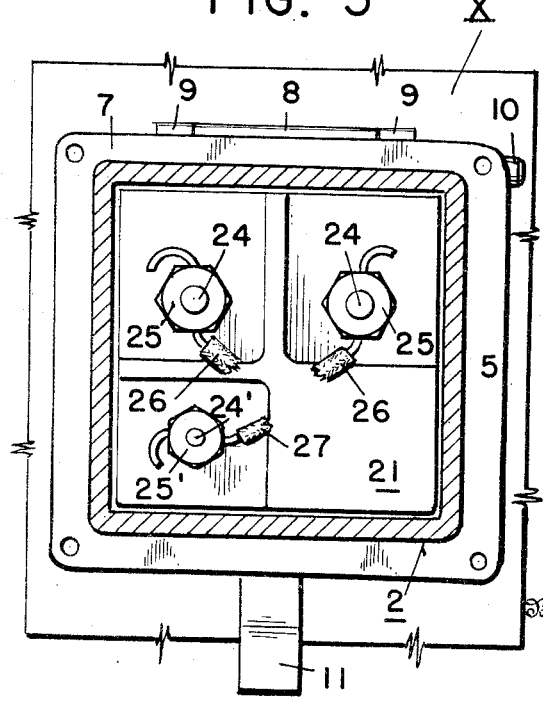

Feb. 20, 1951 D. A. ENSIGN 2,542,404
POWER DISTRIBUTION SYSTEM
Filed Dec. 16, 1948 5 Sheets-Sheet 3

Inventor
DARWIN A. ENSIGN,
By Stone, Boyden & Mack,
ATTORNEYS

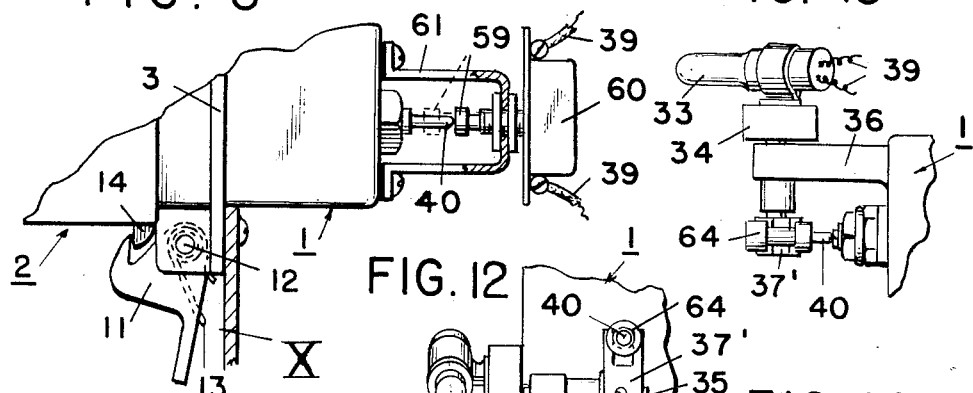
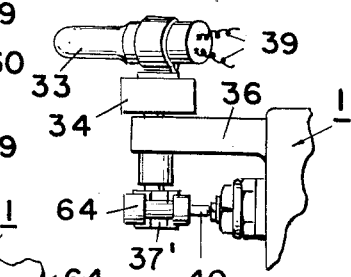
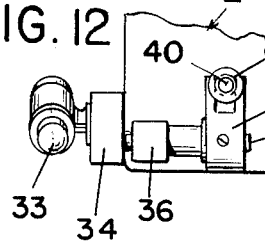
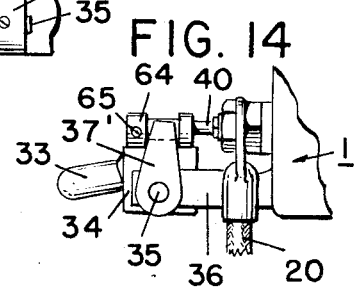
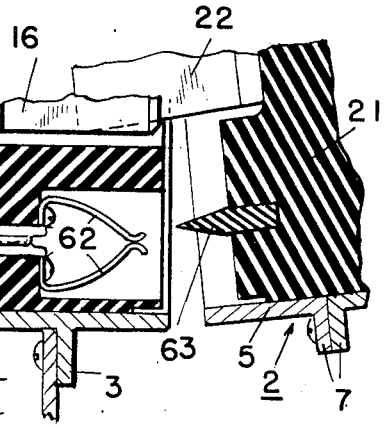
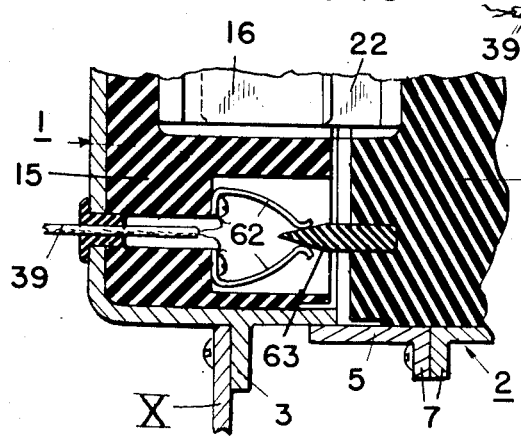

Feb. 20, 1951 D. A. ENSIGN 2,542,404
POWER DISTRIBUTION SYSTEM
Filed Dec. 16, 1948 5 Sheets-Sheet 5

Inventor:
DARWIN A. ENSIGN,
By Stone, Boyden & Mack
Attorneys

Patented Feb. 20, 1951

2,542,404

UNITED STATES PATENT OFFICE 2,542,404

POWER DISTRIBUTION SYSTEM

Darwin A. Ensign, Huntington, W. Va., assignor to Ensign Electric and Manufacturing Company, Huntington, W. Va., a corporation of West Virginia Application December 16, 1948, Serial No. 65,587

10 Claims. (Cl. 171—97)

This invention relates to electric power distribution systems, and more particularly to safety systems such as are employed in coal mines, and the like.

While the invention is designed especially for use in such safety systems, it is applicable to any situation where separable connectors are employed, and where it is desired to prevent arcing or sparking at the contacts when the members of the connectors are separated.

The general object of the invention is to provide improved means, operated by the initial separating movement of the members of a connector for opening the circuit at another point and thus disconnecting the connector from the source of current before the contact elements thereof are disengaged, whereby such contact elements are "dead," when finally separated. Also to provide improved means for preventing the circuit from being re-established until after the contact elements have been brought together in full engagement.

More specifically, an object of the invention is to provide, in connection with the usual overload circuit breaker commonly interposed in such circuits, improved means, operated by the initial separating movement of the members of a connector, for tripping such circuit breaker, and also improved means for preventing such breaker from being closed again before the contact elements of the connector have been brought into full engagement, after having been separated.

Still more specifically, the invention contemplates the employment of a circuit breaker constructed with a shunt trip coil, and the provision of means operated by the separating movement of the members of a connector for energizing such coil.

A further object of the invention is to provide a novel construction of connector equipped with an improved circuit closer controlling the circuit breaker, and located wholly outside of the connector housing or casing.

Still another object is to provide an improved construction of connector in which the plug member is pivotally mounted on the receptacle member and operates with a lever action, thus facilitating moving the contact elements into and out of engagement. The invention also contemplates the provision of a mechanical latch for locking the pivotally connected members together, when assembled.

With the above and other objects in view, and to improve generally on the details of such apparatus, the invention consists of the construction and combination of parts hereinafter described and claimed, and illustrated in the accompanying drawings, forming part of this specification, and in which:

Fig. 1 is a side elevation of my improved connector complete as it appears when installed on a suitable support such as a distribution box, a fragment of the latter being shown in section;

Fig. 2 is a transverse section on the line 2—2 of Fig. 1 looking in the direction of the arrows;

Fig. 3 is an end elevation of the apparatus looking at the left hand end of Fig. 1;

Fig. 5 is a transverse section substantially on the line 5—5 of Fig. 1, looking in the direction of the arrows;

Fig. 6 is a face view of the inner ends of both members of the connector, these members being shown in a position displaced 180° from the position shown in Figs. 1 and 4;

Fig. 7 is a fragmentary side elevation of my improved mercury tube switch, looking from the side opposite that shown in Figs. 1 and 4;

Fig. 8 is a fragmentary side elevation showing a modified construction of circuit closing or controlling device;

Fig. 9 is an end elevation similar to Fig. 3 but showing only the lower half of the apparatus and illustrating another modified arrangement of circuit controlling device;

Fig. 10 is a section substantially on the line 10—10 of Fig. 9 looking in the direction of the arrows;

Fig. 11 is a similar view showing the parts in a different position;

Fig. 12 is a fragmentary front elevation of my improved mercury tube switch showing a slightly modified construction;

Fig. 13 is a plan view of the same;

Fig. 14 is a side elevation of the same;

Figure 4:
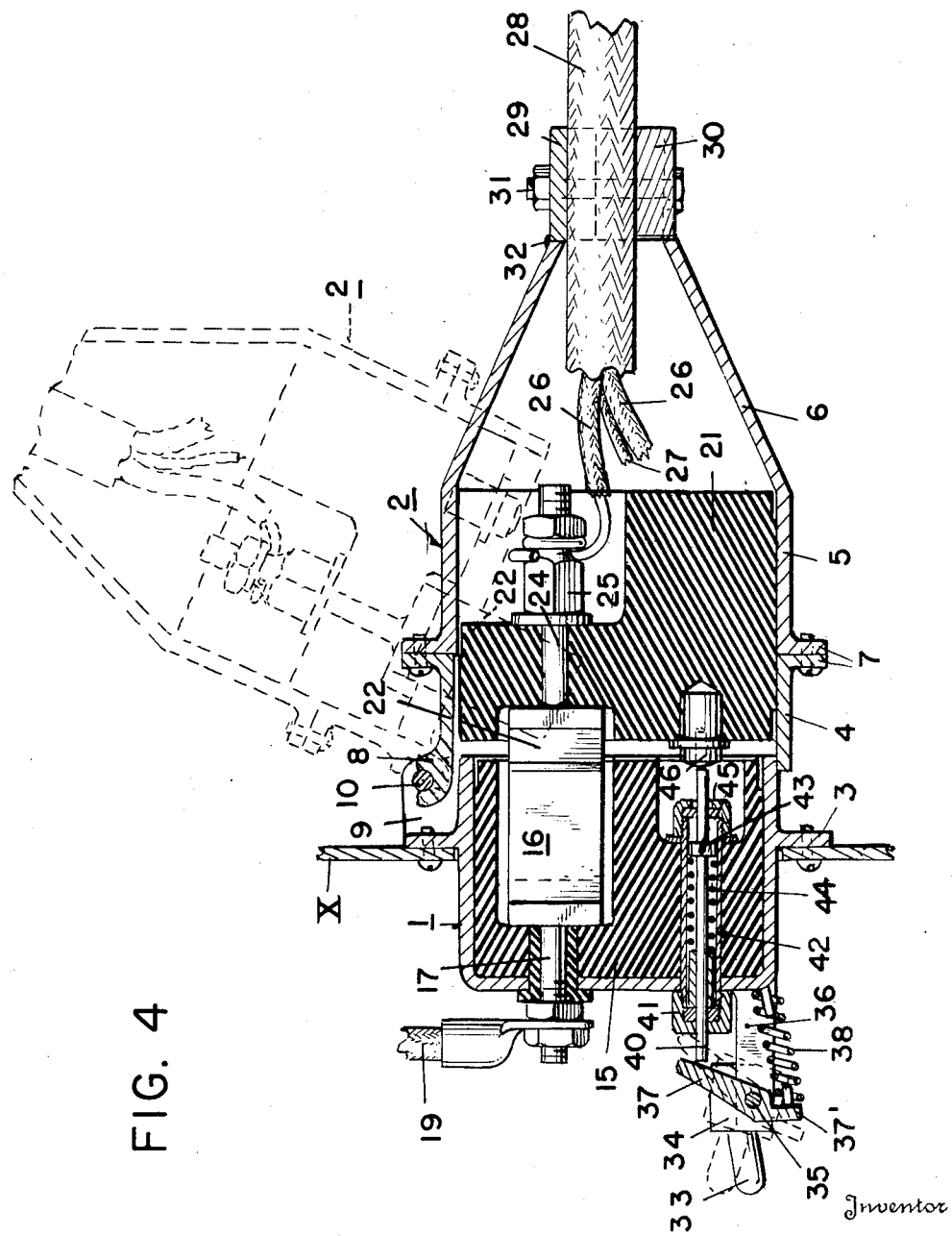
Fig. 4 is a longitudinal section through the entire apparatus shown in Fig. 1, such section being taken substantially on the line 4—4 of Fig. 3, looking in the direction of the arrows.

Referring to the drawings in detail, and more particularly first to Figs. 1 and 4 thereof, my improved connector comprises a receptacle or socket member 1 and a plug member 2, each of these members having a housing or casing enclosing the mechanism.

Although a plug and receptacle of the construction shown and described herein can be used as a line connector, I have illustrated in the drawings the connector having the receptacle member 1 supported on the wall X of a distribution box or other suitable structure. In some cases, this wall is provided with an opening, as shown, through which the casing of the receptacle extends and this casing is provided with a transversely projecting flange 3 which fits against the wall X and may be secured thereto as by means of screws. In other cases, the receptacle housing may be formed integral with the cast metal wall of the box.

The plug member 2 consists of a portion of substantially rectangular cross-section made up of two sections 4 and 5 united by a flanged connection 7, and a tapering pyramidal end portion 6 projecting axially from the section 5, the portions 4, 5 and 6 thus constituting a plug member of elongated form.

The casing of the plug member is pivotally mounted on the receptacle member by means of a pivot pin 10 extending through hinge member 9 on the receptacle. The cooperating hinge member 8 on the plug is of semi-cylindrical shape, open on one side, as clearly shown in Fig. 4, so that when the plug is swung from full line to dotted line position, the hinge member 8 may be completely disengaged from the pin 10 and the plug disconnected from the receptacle.

When in the closed or assembled position shown in Figs. 1 and 4 the plug and receptacle members are locked together by means of a latch 11 mounted on a pivot 12 on the lower side of the receptacle member 1, diametrically opposite the pivot 10. This latch is provided with a suitable spring 13 tending to maintain the latch in engagement with a keeper 14 carried at the lower side of the plug member. This latch, for locking the members of the connector in assembled relation, is useful either when the receptacle member is mounted on a fixed support as shown, or when the plug and receptacle members are used to constitute a line connector, without any support.

Referring now to Fig. 4, it will be seen that a block of insulating material 15 is housed within the casing of the receptacle member 1 and that mounted in pockets or recesses in this block are a plurality of contact elements 16, each in the nature of a U-shaped clip having a pair of parallel arms. By reference to Fig. 6 it will be seen that two such clips 16 are provided and that there is also another and smaller similar clip 18 mounted in the receptacle member. A stem or shank 17, passing through the insulating bushing connects each clip 16 with a conductor 19, these conductors constituting the main power leads. A similar stem or shank 17' connects the clip 18 to another conductor 20 which constitutes the usual ground wire commonly employed in the safety systems used in mines.

Housed within the casing of the plug member 2 is a block of insulation 21 and mounted in the recesses in the face of this block adjacent the receptacle member are a pair of contact elements 22 in the nature of blades, and a similar and smaller contact element or blade 23. It will now be apparent from an inspection of Fig. 6 that when the members of the connector are brought together in closed or assembled relation, the blades 22 enter the clips 16 while the blade 23 enters the clip 18, thus establishing the desired connections.

Each blade 22 is connected by a stem or shank 24 with a binding post 25, and the blade 23 is connected by a similar stem or shank 24' with a binding post 25', these binding posts being mounted in recesses in the outer face of the block 21 as clearly shown in Figs. 4 and 5.

Secured to the binding post 25 are a pair of main conductors or power leads 26, while secured to the binding post 25' is another conductor 27 constituting the ground wire.

The three conductors 26 and 27 are formed into a flexible cable 28 of the usual construction. The ground wire 27 may be a circular conductor but is shown in Fig. 2 as consisting of a flat strip embedded in the insulation between the two main conductors 26, the assembly thus forming a cable of oval cross-section. This cable is tightly held by a clamping device comprising a body portion 29, recessed to receive the cable, and a yoke 30 shaped to enter the recess and bear against the cable. This yoke is forced toward the body of the clamp by means of a pair of bolts 31, thus securely gripping the cable between these parts. The body 29 of the clamp is rigidly secured to the outer end of the pyramidal portion of the plug member as by welding, as indicated at 32. By thus clamping the cable to the casing of the plug member the leads 26 and 27 and binding posts 25 are relieved of any mechanical strain.

One form of improved circuit closer or controller which I may employ for carrying out the purposes of the invention is illustrated in Figs. 1, 3, 4 and 7 and comprises a mercury tube switch 33 supported on a block 34 mounted on a shaft 35 journalled for rocking movement in a bracket 36 projecting from the end wall of the receptacle member 1. A lever 37 is also secured to this shaft 35 and is formed with a tail piece 37' against which bears one end of a compression spring 38, the other end of which bears against the receptacle member 1. Thus this spring 38 tends to rock the lever 37 and the tube 33 from the full line to the dotted line position shown in Figs. 1 and 4. It will be understood that when the mercury tube switch is in the position shown in full lines in all of the figures the circuit controlled thereby is open, whereas, when the switch is tilted to the dotted line position shown in Figs. 1 and 4, the mercury flows back to the rear end and bridges contacts to which wires 39 are connected, thus closing the circuit through these wires.

Referring again more particularly to Fig. 4 it will be seen that I provide a push rod 40 having its outer end bearing against the lever 37. This rod is slidably mounted in a suitable bushing 41 and guide tube 42 extending through the insulation 15, such rod having a collar 43 secured thereto and being surrounded by a spring 44 which bears against this collar and tends to urge the rod inwardly. The inner end of the rod passes through a suitable bushing 45 and terminates in a pocket or recess in the face of the insulation 15 adjacent the plug member.

Set into the adjacent face of the block of insulation 21 in the plug member is an abutment in the nature of a stud or button 46, so positioned as to bear against the inner end of the push rod 40 when the plug and receptacle members are in the closed or assembled position shown in full lines in Figs. 1 and 4. When in such position, the stud 46, acting through the push rod 40 and lever 37 serves to maintain the mercury tube switch 33 in its full line or open position.

Instead of operating the mercury tube switch 33 by means of the spring 38 as shown in Figs. 1 and 4, I may operate it directly by the movement of the rod 40 as illustrated in Figs. 12 to 14 inclusive. Referring to these figures, it will be seen that I employ a rocking lever 37' having a bifurcated upper end which embraces a spool or fitting 64 secured to the rod 40 as by means of a set screw 65. The rod 40 is actuated by the same spring 44 as shown in Fig. 4, and when this rod is reciprocated it operates through the lever 37' to rock or tilt the mercury tube switch.

Figure 15:
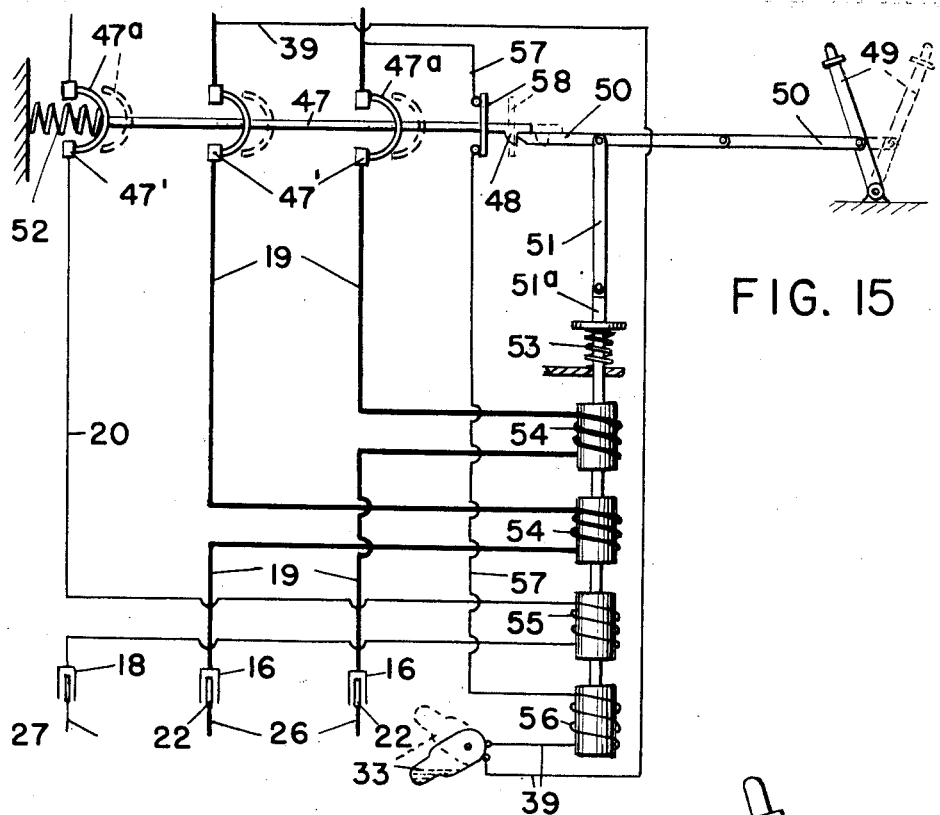
Fig. 15 is a diagram illustrating the circuit arrangement and conventionally showing a circuit breaker used in connection with the invention.

Referring now to Fig. 15, I have illustrated conventionally a three-pole circuit breaker comprising an operating rod 47 carrying three switch members 47ª adapted to engage pairs of contacts 47'. One contact of two of these pairs is connected to a source of current while the other contact of these pairs is connected with the main power leads 19. The other pair of contacts 47' serves to control the ground wire 20.

Figure 16:
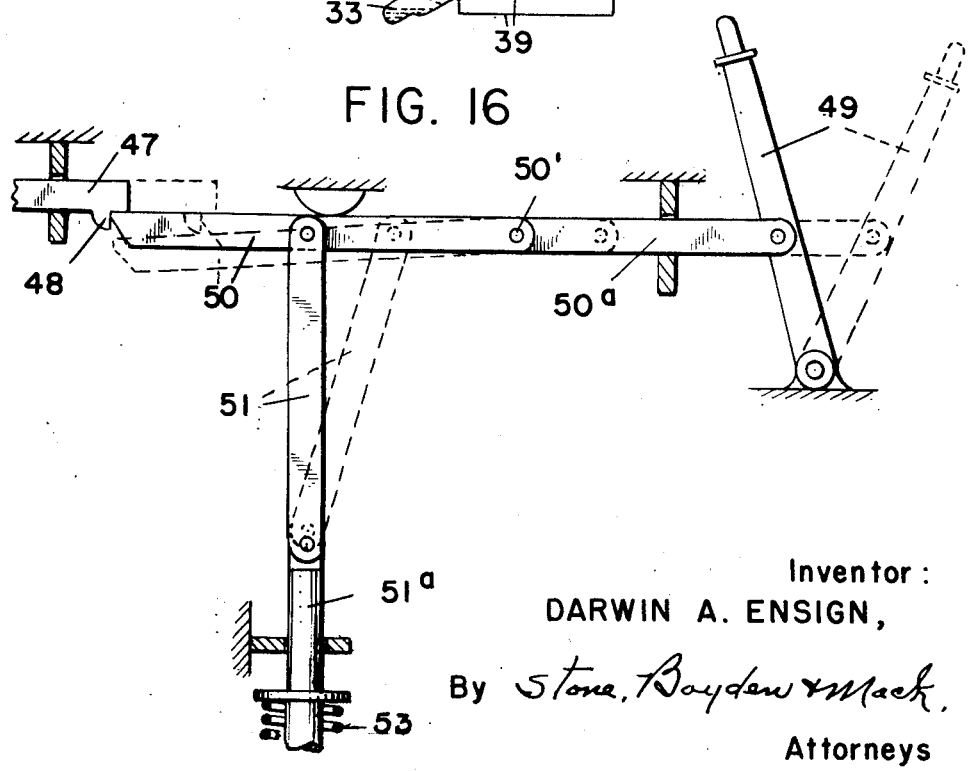
Fig. 16 is a fragmentary side elevation on an enlarged scale showing parts of the mechanism illustrated in Fig. 15.

The switch members 47ª are normally maintained in engagement with the contacts 47', against the tension of the spring 52, by means of a detent 48, on the rod 47, engaging a latch member 50. This latch member 50 is pivotally connected at 50' to one end of a sliding link 50ª, the other end of which is connected with a pivoted operating lever 49 (see Fig. 16).

The latch 50 is connected by means of a link 51 with the upper end of a rod 51ª, which rod carries a collar against which bears a compression spring 53 which tends to maintain the rod and latch 50 in their uppermost position as shown in full lines.

As is usual, the circuit breaker is provided with overload trip coils 54 connected in one or both of the power leads 19, and with a ground limiter coil 55 connected with the ground wire 20. For the purposes of simplicity and clearness all of these coils are shown as surrounding cores connected with each other and with the rod 51ª, and it will be understood that when an excess current flows in any of these coils the latch member 50 is retracted to its lowermost position, shown in dotted lines, thus disengaging the latch from the detent 48. This trips the breaker and allows it to be automatically opened by the spring 52, as indicated by dotted line in Fig. 15.

When it is desired to reset the breaker after it has been tripped, the operator pulls back the lever 49. The upward pressure of the spring 53 causes the upper edge of the latch 50 to ride along on the detent 48 until the latch has moved far enough so that its end slips off of and engages behind the detent as illustrated in dotted lines in Fig. 16. Thereupon by swinging the lever 49 toward full line position, the rod 47 may be pushed back toward the left so as to restore the breaker to closed position. Means (not shown) are provided for maintaining the lever 49 and latch 50 in full line position so as to hold the breaker closed.

As stated in the preamble, the present invention contemplates the use of a shunt trip coil in connection with this circuit breaker. This shunt trip coil is indicated at 56 and is shown as surrounding a core connected with the other cores and with the rod 51ª. One of the wires 39 from the mercury tube switch 33 is connected with one of the power leads at a point beyond the breaker, while the other wire 39 from the mercury tube switch is connected to one end of the coil 56, the other end of which is connected by wire 57 with the other power lead. A cut-off switch 58, operated by the rod 47, is interposed in the conductor 57. This cut-off switch automatically opens when the breaker opens and closes when the breaker is closed. In other words, it opens and closes with the breaker.

It will be seen that when the parts are in the position shown in full lines in Fig. 15, the circuit through the shunt trip coil 56 is complete except at the mercury tube switch 33. If therefore, under these conditions, this switch is tilted to dotted line position, it will close the circuit through the shunt trip coil, thus energizing the same and tripping the breaker, allowing it to open.

To repeat, when the parts of the connector are in assembled or closed position as shown in full lines in Figs. 1 and 4, the mercury tube switch 33 is also in the position shown in full lines, and in this position the circuit through wires 39 is open. Let it be assumed that it is desired to open or disconnect the connector. The operator releases the latch 11 and then swings the outer end of the plug member upwardly about the pivot 10. The initial movement of the plug member from closed position however, serves to shift the abutment stud 46 out of contact with the inner end of push rod 40, thus permitting this rod to move inwardly. Thereupon, by the mechanism shown either in Figs. 1 and 4 or Figs. 12, 13 and 14, the tube 33 is rocked into the dotted line position shown in Figs. 1, 4 and 15, thus closing the circuit between wires 39 and energizing the shunt trip coil 56. This instantly releases the latch 50 and trips the breaker, thus completely disconnecting the main leads 19 from the source of current. At the same time the switch 58 opens, thus breaking the circuit through the shunt trip coil.

It will be noted that this tilting of the mercury tube switch 33 and the closing of the circuit through the wires 39 takes place when the plug member has been swung no further than indicated in dotted lines in Fig. 1, that is to say while the clips 16 and blades 22 of the main contact elements are still in full engagement. Thereafter, when the plug is swung around into the position shown in dotted lines in Fig. 4, so as to disengage the contact elements 16 and 22, these elements, at the time of their final separation, are completely dead or cold, and therefore all arcing or sparking at such contacts is eliminated. In other words, the initial movement of the plug member serves to disconnect the contact elements of the receptacle member from the source of current completely, before the contact elements of the two members are disengaged.

Should the operator attempt to re-close the breaker, by means of the lever 49, before the plug and receptacle members of the connector have been again brought completely into closed or assembled relation, and thus before the stud 46 has moved the switch 33 to full line or open position, the cut-off switch 58, which is preferably set to close slightly in advance of the breaker contacts, will close first. The mercury tube switch being already closed, the shunt trip coil will be immediately energized and the latch 50 tripped out of engagement with the rod 47, so that the breaker is prevented from reaching closed position. In other words, it is impossible to close the breaker, if the plug and receptacle members of the connector have not been brought into completely assembled relation.

While by way of illustration I have shown in Fig. 15 the overload coils, ground limiter coil, and shunt trip coil as all operating directly on the same latch member, it will of course be understood that this showing is merely schematic, and that any other well known arrangement of tripping mechanism, such as an arrangement including relays, can be employed without departing from the spirit of the invention.

There are many other ways in which the initial swinging movement of the plug member can be made to close the circuit through the shunt trip coil, instead of employing a mercury tube switch, such as above described. One of these alternative ways is shown in Fig. 8. In this figure I have illustrated the circuit through wires 39 as being controlled by a push-button type switch 60 having an operating head or button 59 against which the end of push rod 40 engages. The switch 60 may be supported on the receptacle member 1 by means of a suitable bracket 61. It will be understood that the push-button switch 60 is the type which remains open as long as pressure is applied to the head 59, but which closes automatically when this pressure is removed.

It will be observed that in both of the arrangements shown in Figs. 1 and 4 and in Fig. 8 the circuit closing switch is located wholly outside the plug and receptacle members constituting the connector. Thus it is not necessary to bring the control wires 39 inside of the connector.

In Figs. 9, 10 and 11 I have illustrated still another form of circuit closing device which may be employed. In this form, instead of the push-rod and associated parts illustrated in Fig. 4, I employ a pair of resilient contacts 62 mounted in a recess or pocket in the block of insulation 15, and the control wires 39 are brought into the connector through a suitable bushing and fastened to these contacts 62. These contacts are so constructed that they normally tend to engage each other as shown in Fig. 11, thus closing the circuit between the wires 39. Normally however, when the connector is in fully closed or assembled position as shown in Fig. 2, a wedge block 63, of insulating material, set into the plug member, enters between the contacts 62 and holds them apart, as shown in Fig. 10, thus maintaining the circuit between the wires 39 open. During the initial upward swinging movement of the plug member 2, however, this wedge block 63 is withdrawn from between the contacts 62, thus permitting them to come into engagement, and to close the circuit through the wires 39, thereby tripping the breaker as above described.

Fig. 11 also well illustrates how the breaker is tripped during the early stages of the movement of the plug member, and while the contact elements 16 and 22 are still in substantial engagement.

Still other means by which the initial movement of the plug member about its pivot can be caused to energize the shunt trip coil and thus trip the breaker will readily suggest themselves to those skilled in the art.

Referring again to Fig. 4, in conjunction with Figs. 10 and 11, it will be seen that the means for closing the control circuit through wires 39 are located at a much greater distance from the pivot 10 than are the main contact elements 16 and 22. Thus in the case of Fig. 4, the stud 46, and in the case of Figs. 10 and 11, the wedge block 63, moves much farther and faster than does the contact blade 22. Hence the control mechanism operates before the blade moves to any substantial extent.

By virtue of the elongated form of the plug member 2 and its pivotal connection with the receptacle member as shown, an effective lever action is provided, and this gives the operator a mechanical advantage which greatly facilitates moving the contact elements into and out of engagement.

What I claim is:

1. In a power distribution system, the combination with a connector comprising separable receptacle and plug members having interengaging contact elements, of a circuit breaker controlling the supply of current to said connector, a shunt trip for causing said circuit breaker to open, means responsive to the initial relative separating movement of said plug and receptacle members for operating said shunt trip, manual means for reclosing said breaker, and means for preventing re-closing of said breaker until after said contact elements have been again brought into full engagement.

2. In a power distribution system, the combination with a connector comprising separable receptacle and plug members having interengaging overlapping contact elements, and conductors connected with the contact elements of each, of a circuit breaker controlling the supply of current to said connector, a circuit closer independent of said conductors located wholly outside of said plug and receptacle members, means whereby the actuation of said circuit closer trips said breaker, and means operated by the initial relative movement of said plug and receptacle members for actuating said circuit closer before said contact elements are disengaged.

3. In a power distribution system, the combination with a connector comprising separable receptacle and plug members having interengaging contact elements, of conductors connected with the contact elements of both said receptacle and plug members, a circuit closer independent of said conductors, separate from and located wholly outside of said plug and receptacle members, and means operated by the initial movement of said plug member in separating it from said receptacle member for automatically actuating said circuit closer.

4. The combination with a connector comprising separable receptacle and plug members having interengaging contact elements, of conductors connected with the contact elements of both said receptacle and plug members, a push rod slidably mounted in said receptacle member, an abutment carried by said plug member for engaging and moving said rod, and a circuit controlling device independent of said conductors operated by said rod.

5. The combination with a connector comprising separable receptacle and plug members having interengaging contact elements, of a pivotally mounted mercury tube switch, spring means for maintaining said switch in one position, a push rod slidably mounted in said receptacle member, an abutment carried by said plug member for engaging and moving said rod, and means operated by said rod for rocking said tube switch on its pivot against the tension of said spring into another position.

6. The combination with a connector comprising separable receptacle and plug members having interengaging contact elements, of conductors connected with the contact elements of both said receptacle and plug members, a push rod slidably mounted in said receptacle member, an abutment carried by said plug member for en- gaging and moving said rod, as said plug is inserted in said receptacle, and a circuit controlling device independent of said conductors in the nature of a push-button switch operated by said rod.

7. In a power distribution system, the combination with a connector comprising separable receptacle and plug members having interengaging contact elements, of a fixed support on which said receptacle member is mounted, means pivotally connecting said plug member to said receptacle member adjacent one edge so that said members are separated by a swinging movement of said plug member about its pivot, a circuit closer carried by said receptacle member said closer being open when the said contact elements of the connecter are in normal fuel engagement, and means operated by the initial swinging movement of said plug member for automatically causing said circuit closer to close.

8. In a power distribution system, the combination with a connector comprising separable receptacle and plug members having interengaging contact elements, of a fixed support on which said receptacle member is mounted, means pivotally connecting said plug member to said receptacle member adjacent one edge so that said members are separated by a swinging movement of said plug member about its pivot, a circuit closer carried by said receptacle member said closer being open when the said contact elements of the connecter are in normal fuel engagement, and means located at a greater distance from said pivot than said contact elements and actuated by the swinging movement of said plug member for automatically causing said circuit closer to close.

9. In combination, a connector comprising separable plug and receptacle members having interengaging contact elements enclosed therein, said plug member being of elongated form and pivotally mounted at one end on said receptacle member adjacent one edge thereof, and a flexible cable entering the opposite end of said plug member, and connected with the contact elements therein, whereby said plug member may be swung about its pivot with a lever action in bringing said contact elements into and out of engagement.

10. In combination, a connector comprising separable plug and receptacle members having interengaging contact elements enclosed therein, said plug member being of elongated form and pivotally mounted at one end on said receptacle member adjacent one edge thereof, a flexible cable entering the opposite end of said plug member, and connected with the contact elements therein, whereby said plug member may be swung about its pivot with a lever action in bringing said contact elements into and out of engagement, and a spring catch at the opposite edge of said receptacle member for locking said members together in assembled relation.

DARWIN A. ENSIGN.

REFERENCES CITED

The following references are of record in the file of this patent:

UNITED STATES PATENTS

| Number | Name | Date |
|---|---|---|
| 1,153,019 | Bouche | Sept. 7, 1915 |
| 1,273,719 | Arnold | July 23, 1918 |
| 1,384,491 | Simmon | July 12, 1921 |
| 1,637,090 | Rumble | July 26, 1927 |
| 1,890,321 | Fitzgerald | Dec. 6, 1932 |
| 2,299,206 | Berg | Oct. 20, 1942 |
| 2,369,860 | Schroeder | Feb. 20, 1945 |
| 2,417,369 | Luhn | Mar. 11, 1947 |
| 2,424,812 | Gallaher | July 29, 1947 |
| 2,448,832 | Ross | Sept. 7, 1948 |